E. A. JEFFREYS & R. F. MUIRHEAD.
BELT GEARING.
APPLICATION FILED APR. 27, 1914.
1,174,866.
Patented Mar. 7, 1916.
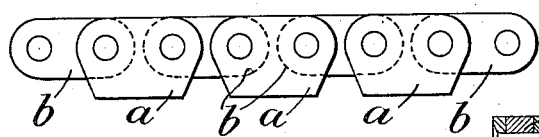
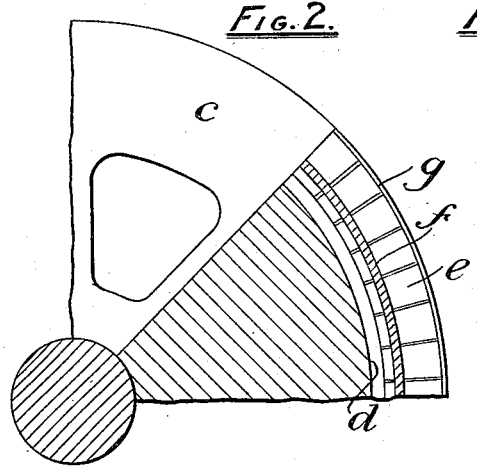
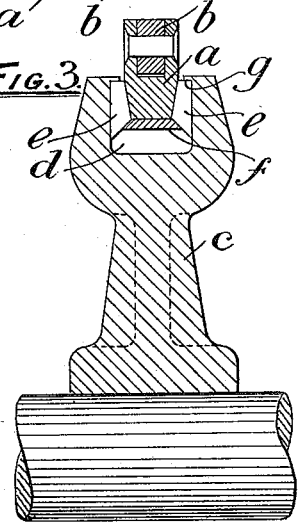
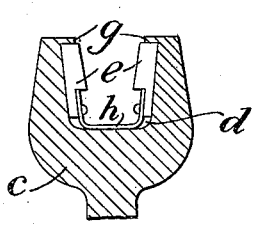
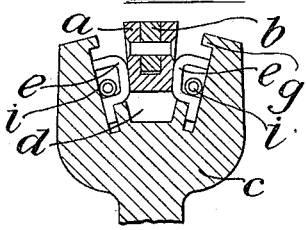
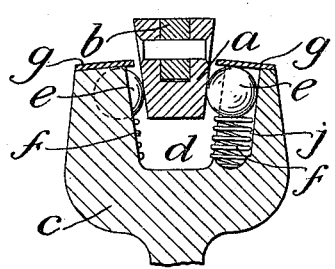
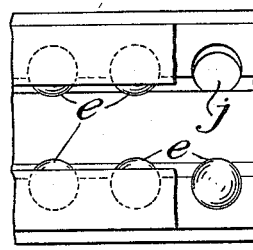
Witnesses.
William T. Nase.
Charles H. York.
Inventors
Edward A. Jeffreys.
Robert F. Muirhead.
by their Attorneys
Howson & Howson

UNITED STATES PATENT OFFICE.

EDWARD AUGUSTUS JEFFREYS AND ROBERT FRANKLIN MUIRHEAD, OF GLASGOW, SCOTLAND.

BELT-GEARING.

1,174,866.   Specification of Letters Patent.   Patented Mar. 7, 1916.

Application filed April 27, 1914. Serial No. 834,838.

*To all whom it may concern:*

Be it known that we, EDWARD AUGUSTUS JEFFREYS and ROBERT FRANKLIN MUIRHEAD, subjects of the King of Great Britain and Ireland, and residents of Glasgow, Scotland, have invented new and useful Improvements in Belt-Gearing, of which the following is a specification.

This invention has reference to and comprises improvements in and relating to the transmission of power and consists of appliances for transmitting power by chains or bands without the use of sprocket or toothed wheels, friction being the agency employed. The chief improvement consists in modifying the method by which the chain grips the driving and driven wheels or pulleys by interposing intermediate movable pieces or devices between the links of the chain and the wheel in such a way that while a firm frictional grip is obtained the links of the chain or portions of the band are prevented from becoming jammed on the wheels, and have an easy relief in passing from them.

In order that our invention and the manner of carrying same into effect or practice may be properly understood by others skilled in the art to which it relates, we have hereunto appended one sheet of illustrative drawings, the various figures in which will be hereinafter referred to.

In the drawings, Figure 1 is a side elevation of the chain forming part of our invention, Figs. 2 and 3 are respectively a side elevation partly in section and a vertical section of part of a pulley forming part of the invention, Figs. 4, 5 and 6 are fragmentary vertical sections of modified forms of the pulley shown in Fig. 3, and Fig. 7 is a plan of the structure shown in Fig. 6.

In these drawings the chain is shown as consisting of wedge shaped links $a$ connected by intermediate links $b$ which do not act on the wheel. The wheel or pulley $c$ is formed with a peripheral groove $d$ and a series of wedge pieces $e$ each resting with one face on the angled side of the groove $d$, in which position they are maintained by a flat spring hoop $f$ passing around the groove, which presses them in the outward direction and by projecting ledges $g$ at the upper edges of the groove $d$, which prevent them from being forced out by the action of the spring hoop $f$.

The wedge shaped links $a$ of the chain, one of which is shown in section in Fig. 3, enter between the two rows of wedge pieces $e$ and produce a side pressure which enables the chain to grip the wheel frictionally. The angle of inclination of the sloping sides is small, say about 5° while that of the entering link wedge is larger, say about 20° with the result that the frictional grip has an amount due to the narrow angle of the groove, while the wider angle of the link wedge prevents it from jamming, and facilitates release at the proper time. Though single wedge shaped pieces formed with rope gripping notches have been used in each side of a groove heretofore to enable a rope to get a wedging grip, the use of the arrangement described and which amounts to a compound wedge with different angles, which, in entering, acts as a single wedge with an acute angle viz., that between the faces in contact with the sides of the groove, so acute that if it were a simple wedge, it would remain jammed, but is released at the proper time by the initial outward motion of the wider-angled link wedge relative to the side wedges, gives the advantage of the intense frictional grip above referred to, with an easy release at the appropriate time. The flat spring hoops $f$ can be split and sprung into place on the wheel $c$ or the wheel $c$ may be made in two portions bolted together, but these methods of putting on rings or hoops are not illustrated, being well known engineering devices.

An equivalent method is illustrated by Fig. 4, where instead of the wedge pieces $e$ being kept in position by the spring hoop $f$, shown in Figs. 2 and 3, they are connected in opposite pairs by a light spring $h$ which rests, as shown, on the bottom of the groove $d$. In these modifications in which wedge pieces are used, instead of having a narrow angle between the sides of the groove, and a wider angle between the sides of the link wedge, the arrangement may be reversed the link wedge being given a smaller angle and the sides of the groove a larger one. In this case, as illustrated by Fig. 5, the wedge pieces $e$ have their thicker ends placed outward instead of inward, and are kept in position by an endless spiral spring $i$ passing all around the pulley and held within a recessed part of the wedge pieces $e$ and impelling them inward toward the bottom of the groove $d$ instead of outward in the manner shown in Figs. 3 and 4. When this arrangement is adopted, there will be at the instant of release, a slight relative motion between the wedge pieces $e$ and the sides of the groove, before the chain lifts from its position between the wedge pieces. On the other hand, when the arrangement is as in Figs. 3 and 4, the first relative motion will be between the link wedges and the wedge pieces $e$. Otherwise, as illustrated by Figs. 6 and 7, which are respectively a sectional edge view and a plan of part of a wheel, instead of the wedge pieces $e$, equivalent intermediate movable pieces consisting of steel balls $e$, are placed in two series of cylindrical holes $j$ at short intervals all around the rim of the wheel $c$, the holes $j$ not being complete cylinders but having one side open toward the groove $d$ in the rim of the wheel $c$, so that each wedge link $a$ as it enters the groove, rests on two or more balls which roll inward and enable the wedge link $a$ to exert great side pressure. In the figures, one ball $e$ is shown in each hole. The holes $j$ are shown having their axes slightly inclined toward one another inward. A light spring $f$ at the bottom of the hole keeps the balls when not in action, at their highest positions in the holes, and two hoops $g$ are secured around the periphery of the wheel to cover the tops of the two series of holes to prevent the balls $e$ from getting out of the holes. This device has the effect of enabling the link wedges to press into the groove on the pulley as if it were a frictionless wedge of half its actual angle, since the wedge moves twice as far as the centers of the rolling balls, and the side pressure is determined accordingly. On the other hand the chain cannot move peripherally relative to the wheel without rubbing taking place either between the wedge links and the balls, or between the balls and the sides of the pockets. Again, since release is effected by pure rolling motion of the balls, it is virtually frictionless.

What we claim as our invention and desire to secure by Letters Patent is:—

1. In a friction drive for the transmission of power, the combination with a driving chain fitted with wedge shaped blocks, and grooved wheels or pulleys, of intermediate pieces or devices between the blocks of the chain and the wheel giving a frictional grip with an easy release of the chain, all substantially as set forth.

2. In a friction drive for the transmission of power, the combination of a driving chain having wedge shaped links, with grooved wheels or pulleys having intermediate movable pieces which act with the link wedges of the chain as a compound wedge having wide and narrow angles in combination for the purpose of giving a good frictional grip with an easy release of the chain, substantially as set forth.

3. In a friction drive for the transmission of power, the combination of a driving chain having wedge shaped links, with grooved wheels or pulleys having a series of steel balls in holes on each side of the groove, supported by springs and kept in place by outer hoops on the edges of the groove substantially as set forth.

In testimony whereof, we have signed our names to this specification, in the presence of two subscribing witnesses.

EDWARD AUGUSTUS JEFFREYS.
ROBERT FRANKLIN MUIRHEAD.

Witnesses:
ROBERT CLEGHORN THOMSON,
MAY MACKENZIE.

Copies of this patent may be obtained for five cents each, by addressing the "Commissioner of Patents, Washington, D. C."